United States Patent
Kurian

(10) Patent No.: US 10,574,651 B2
(45) Date of Patent: Feb. 25, 2020

(54) INTERNET OF THINGS ("IOT") CHAIN LINK

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 202 days.

(21) Appl. No.: 15/919,407

(22) Filed: Mar. 13, 2018

(65) Prior Publication Data

US 2019/0289004 A1    Sep. 19, 2019

(51) Int. Cl.
*H04L 29/06* (2006.01)
*H04L 29/08* (2006.01)
*H04L 9/08* (2006.01)

(52) U.S. Cl.
CPC ........ *H04L 63/0884* (2013.01); *H04L 9/0861* (2013.01); *H04L 63/0471* (2013.01); *H04L 63/126* (2013.01); *H04L 69/22* (2013.01)

(58) Field of Classification Search
CPC . H04L 9/3239; H04L 2209/38; H04L 9/0637; G06F 21/602; G06F 21/64
USPC ............................................................. 726/4
See application file for complete search history.

(56) References Cited

U.S. PATENT DOCUMENTS

| | | | |
|---|---|---|---|
| 9,319,404 B2 | 4/2016 | Svigals | |
| 9,485,231 B1 | 11/2016 | Reese | |
| 9,565,192 B2 | 2/2017 | Chillappa et al. | |
| 9,591,016 B1 | 3/2017 | Palmieri et al. | |
| 9,699,659 B2 | 7/2017 | Zehavi et al. | |
| 9,699,814 B2 | 7/2017 | Zakaria et al. | |
| 9,716,595 B1 | 7/2017 | Kravitz et al. | |
| 9,729,528 B2 | 8/2017 | Zakaria et al. | |
| 9,825,921 B2 | 11/2017 | Reese | |
| 9,875,510 B1 | 1/2018 | Kasper | |
| 10,251,053 B1 | 4/2019 | Paczkowski et al. | |
| 10,496,290 B1 * | 12/2019 | Visvanathan | G06F 3/0652 |

(Continued)

OTHER PUBLICATIONS

"Securing the Internet of Things: A Proposed Framework," https://www.cisco.com/c/en/us/about/security-center/secure-iot-proposed-framework.html, Mar. 16, 2016.

(Continued)

*Primary Examiner* — Haresh N Patel
(74) *Attorney, Agent, or Firm* — Weiss & Arons LLP; Michael A. Springs, Esq.

(57) ABSTRACT

Systems and methods for securing the communication in a structured IoT system between a first, second, and third node and a base IoT hub is provided. The base IoT hub may be in direct connection with the internet. The system may include the first IoT node in electronic communication with the second IoT node. The second node may be in electronic communication with the third IoT node. The third node may be in electronic communication with the hub. The hub may be in electronic communication with the first node. The system may be configured to generate a data packet including an authorization header. The header may include a first segment corresponding to a first node, a second segment corresponding to the second node, and a third segment corresponding to the third node. The header may be configured to store an encrypted ID authentication token generated by the corresponding node.

20 Claims, 4 Drawing Sheets

(56) References Cited

U.S. PATENT DOCUMENTS

| | | |
|---|---|---|
| 2016/0173495 A1 | 6/2016 | Joo |
| 2016/0248746 A1 | 8/2016 | James et al. |
| 2016/0259937 A1 | 9/2016 | Ford et al. |
| 2016/0260095 A1 | 9/2016 | Ford |
| 2016/0337127 A1 | 11/2016 | Schultz et al. |
| 2016/0366181 A1 | 12/2016 | Smith et al. |
| 2017/0163444 A1 | 6/2017 | McLaughlin et al. |
| 2017/0289184 A1 | 10/2017 | C et al. |
| 2018/0115428 A1* | 4/2018 | Lysenko ............... H04L 63/123 |
| 2018/0123887 A1* | 5/2018 | Thubert ................ H04W 84/12 |
| 2018/0123963 A1* | 5/2018 | Thubert ............ H04W 28/0263 |
| 2018/0124632 A1* | 5/2018 | Thubert ................ H04L 5/0055 |
| 2018/0124646 A1* | 5/2018 | Thubert ................ H04W 4/70 |
| 2018/0124688 A1* | 5/2018 | Thubert ................ H04W 48/14 |
| 2018/0181756 A1* | 6/2018 | Campagna ............. H04L 9/088 |
| 2018/0183601 A1* | 6/2018 | Campagna ........... H04L 9/3247 |
| 2018/0191746 A1* | 7/2018 | De Knijf ................ G06F 21/52 |
| 2018/0253451 A1 | 9/2018 | Callan et al. |
| 2018/0302424 A1* | 10/2018 | Bender ............... H04L 63/1425 |
| 2019/0021004 A1* | 1/2019 | Shanmugavadivel .. H04L 63/10 |
| 2019/0116142 A1* | 4/2019 | Chalakudi ............... H04L 67/20 |
| 2019/0139047 A1* | 5/2019 | Ronnow ............. G06F 21/6209 |
| 2019/0172566 A1 | 6/2019 | Schulman et al. |
| 2019/0215704 A1* | 7/2019 | Thubert ................ H04W 24/02 |
| 2019/0215838 A1* | 7/2019 | Henry ............... H04W 72/0486 |
| 2019/0253238 A1* | 8/2019 | Schnabel ............... H04L 9/3239 |
| 2019/0289454 A1 | 9/2019 | Inoue |
| 2019/0349190 A1 | 11/2019 | Smith et al. |
| 2019/0354610 A1* | 11/2019 | Schnabel ............... H04L 9/0891 |

OTHER PUBLICATIONS

"Global Hacker Botnet tops 6 million hijacked devices," http://www.computerweekly.com/news/450427023/Global-hacker-botnet-tops-6-million-hijacked-devices, Sep. 27, 2017.

"Cookies Vs. Tokens: The Definitive Guide," https://auth0.com/blog/cookies-vs-tokens-definitive-guide/, May 31, 2016.

* cited by examiner

INTERNET OF THINGS ("IOT") CHAIN LINK

FIELD OF TECHNOLOGY

Aspects of the invention relate to enhancing network security. Specifically, aspects of the invention relate to structuring IoT communications between IoT nodes and an IoT hub to enhance security.

BACKGROUND OF THE DISCLOSURE

An IoT system typically includes multiple Internet of Things ("IoT") nodes. Communication between each of the IoT nodes is typically unstructured, with each IoT node potentially communicating two or more other IoT nodes. Additionally, an IoT hub may be configured to receive communications from a plurality of IoT nodes. This is undesirable at least because unstructured communication between IoT nodes may leave the network vulnerable to a malicious device joining the system.

It would be desirable, therefore, to provide systems and methods for structuring IoT communications between IoT nodes and an IoT hub to enhance network security and provide structure in overall network communications.

SUMMARY OF THE DISCLOSURE

A method for structuring IoT communications between a plurality of nodes and a base IoT hub is provided. The base IoT hub may contain a direct connection to the internet. The base IoT hub may be in electronic communication with a first node. The base IoT hub may be in electronic communication with a second node. The base IoT hub may be in electronic communication with a third node.

The nodes may be linked to the base IoT hub in the form of a circuit. The first node may be in electronic communication with the second node. The second node may be in electronic communication with the third node. The third node may be in electronic communication with the base IoT hub. The base IoT hub may communicate with the first node and the communication may then be forwarded to each additional node, when necessary, in the order that they may be linked. The circuit may form a strong tie between all the linked devices and may strengthen the security level between each of the nodes and the base IoT hub. A malicious device or an attacker may not be able to link to one of the linked nodes in the circuit because of the strong tie formed between each connected node.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
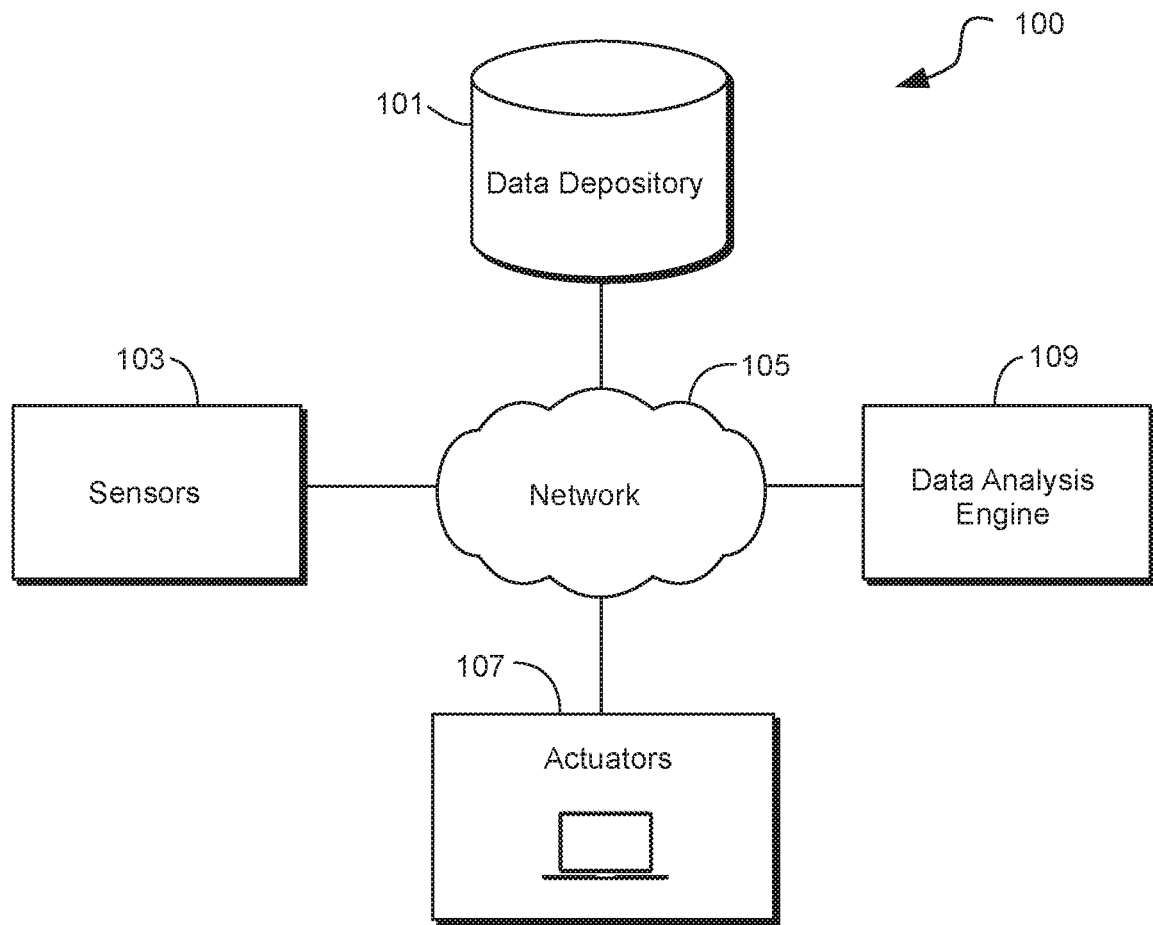
FIG. 1 shows an illustrative system architecture in accordance with principles of the invention.

Systems and methods for structuring IoT communications between a plurality of nodes and a base IoT hub is provided. The systems and methods may be implemented on any suitable hardware device, such as a mobile phone, tablet, personal computer, television, server, watch, appliance, RFID tag, or any other hardware or software devices that supports a connection to one or more communication networks. The hardware device may be disposable. The hardware device may be reusable. The hardware device may be an IoT node. The hardware device may be an IoT hub.

The method, performed by the base IoT hub, may include the base IoT hub receiving, from the third node, a data packet. The data packet may be a data communication. (The data packet may be referred to alternately herein as a "data communication"). The communication may be generated from a trigger by a sensor on the node.

The data communication may be used for statistical analysis. The data communication may be used to change settings on apparatus in a home. The data communications may be used for advertisements.

When the data packet is received from a node other than the third node, the method may include the base IoT hub rejecting the data packet.

The data packet may include an encrypted authorization header. The authorization header may include a first segment corresponding to the first node. The authorization header may include a second segment corresponding to the second node. The authorization header may include a third segment corresponding to the third node. Each of the segments may include an encrypted ID authentication token that may be generated by the corresponding node.

The ID authentication token may be generated based on data included in a node profile. The first node may include a node profile. The second node may include a node profile. The third node may include a node profile. Each of the nodes may include a unique node profile. Each of the node profiles may be stored on the node. Each of the node profiles may include node characteristics and configuration settings of its node. The tokens may be encrypted to protect the data that may have been generated based on node characteristics and configuration settings stored in the node profile.

The base IoT hub may be configured to reject the data packet when the data packet does not include an encrypted authorization header.

When the data packet is received at the base IoT hub, the method may further include the base IoT hub quarantining the data packet for validation at the hub. The processing of the data packet may be withheld until verification of the data packet and the node transmitting the data packet are authorized.

During quarantine, the method may include the base IoT hub decrypting the encrypted ID tokens within the authorization header. The method may further include the base IoT hub performing a validation check on each of the three decrypted ID authentication tokens. The validation check may verify the validity of the data packet. The validation check may include verifying each individual ID authentication token. The validation check may include verifying that decrypted node characteristics and configuration settings of the ID authentication token of each segment match to node characteristics and configuration settings of the corresponding node profile.

It may be determined that one or more ID authentication tokens do not correspond to the node profile. In the event that one or more of the decrypted node characteristics and configuration settings of each of the ID authentication tokens do not match to the node characteristics and configuration settings of the corresponding node profile, the method may further include the base IoT hub rejecting the data packet. In response to the determination that one or more tokens do not correspond to its node profile, the method may further include running an algorithm to evaluate the integrity of the node that did not match its profile. The algorithm may include comparing node configuration settings to configuration settings associated with the node stored in a database runbook. The database runbook may be stored in a hub database. The algorithm may also include comparing node characteristics to characteristics associated with the node stored in the database runbook. The algorithm may further include retrieving updates performed on the node by the base IoT hub and determine whether data communication received from the node conforms to the updates performed. The algorithm may further include analyzing historical data stored in the runbook relating to the integrity of the data communications received from the node. Results from the algorithm may determine the integrity of the node that did not match its corresponding profile when the validation check was performed.

When the results of the algorithm performed determine inaccuracy, the method may include disconnecting the node from the circuit of IoT nodes. The method may further include instructing the other nodes in the system to remove the segment within the authorization header that may correspond to the node that may have been disconnected. In certain embodiments, the method may include restarting the node prior to disconnecting the node from the circuit. When the node is restarted, the validation check may be performed a second time and may determine a more accurate result. In the event that the second validation check further determines inaccurate results, the node may be disconnected from the circuit of IoT nodes. In certain embodiments, the method may include running a remedial sequence of actions on the node to determine authenticity.

In certain embodiments, the data packet may be received at the base IoT hub without an authorization header. In this embodiment, the method may include the base IoT hub rejecting the data packet. When the data packet is received without the header, this may indicate that an unauthorized node that may not be linked to the circuit may be attempting to enter the system.

The validation check may include confirming that each of the three segments contains an ID authentication token generated by the corresponding node. One or more of the three segments may be determined to be lacking an ID authentication token. In the event that a token is missing, the method may further include the base IoT hub returning the data packet to the first node.

When all three segments contain an ID authentication token, the method may include the base IoT hub releasing the data packet from the quarantine state. The method may further include the base IoT hub processing the data packet. The processing may include transmitting the data to the cloud. The data may be transmitted to the central processing unit ("CPU"). The data may be used to identify trends. The data may be used in analytics to determine behavioral or statistical tendencies. The data may be used to calibrate or recalibrate settings of personal devices at home or elsewhere.

When the data packet requires being returned to the first node, the method may include the base IoT hub transmitting the data packet to the first node. The first node may be configured to generate an ID authentication token. The token may be an encrypted token. When the token is generated, the first node may be configured to input the token into the first segment of the authorization header. Following the inputting of the token, the method may include the first node forwarding the data packet to the second node. The method may further include, prior to generating a token, checking the second segment for a previously generated ID authentication token. In the event that the second segment may include a generated token, the method may include the second node forwarding the data packet to the third node. In the event that the second node does not include a generated ID token, the method may include the second node generating an ID authentication token. The token may be an encrypted token. When the token is generated, the method may further include the second node inputting the token into the second segment of the authorization header. Following the input of the token, the method may include the second node forwarding the data packet to the third node. The third segment may include a previously generated ID authentication token and the third node may be configured to forward the data packet to the base IoT hub for processing.

In certain embodiments, the data packet may be initially received at the second node and not at the first node. When the data packet is received at the second node, the second node may be configured to generate an ID token and the third node may be configured to generate an ID token. The data packet may be transmitted to the base IoT hub prior to the first node generating an ID token. In this embodiment, when the data packet is received at the base IoT hub, the validation check may determine that the first segment does not include a generated ID authentication token and the method may include returning the data packet to the first node for a generated ID token. The first node may be the only node required to generate an ID authentication token.

In another embodiment, when the data packet is received at the base IoT hub, it may be determined from the validation check, that a generated ID authentication token may be included in the first segment and in the third segment. In this embodiment, when a generated ID authentication token is lacking in the second segment, the method may further include rejecting the data packet. For example, a data packet may be received at the first node. The first node may be configured to generate the ID authentication token. Since the nodes form a circuit, the method includes transmitting the data packet to the second node, following the first node. When the validation check is performed and it is determined that a generated ID authentication token is lacking in the second node, this may be a signal that there may be unauthorized data filtering the system. This may determine that a malicious device may have entered the system. The method may then include rejecting the data packet to secure the linked nodes.

In another embodiment, the method may include linking a fourth node to the base IoT hub. The fourth node node may be configured to be in electronic communication with the base IoT hub. Prior to linking the fourth node, the method may include running an authentication routine on the fourth node. The authentication routine may include assessing configuration settings and IoT node characteristics of the fourth node to assess compliance with a runbook stored in a base IoT hub database. The node characteristics and configuration settings of the fourth node may be included in the node. When a fourth node may be linked, the authorization header of the data packet may now be a first authorization header. When the authentication routine performed determines the compliance, the method may further include generating a second authorization header. The second authorization header may include a fourth segment corresponding to the fourth node. The method may further include instructing the first, second, and third node, prior to sending the data packet, to replace the first authorization header with the second authorization header. When the fourth node is linked to the circuit, the method may further include instructing the third node to transmit all data packets to the fourth node and not to the base IoT hub. When the data packet is received at the fourth node, the fourth node may generate an ID authentication token. The token may be an encrypted token. The method may further include inputting the generated ID authentication token into the fourth segment of the header. The method may further include transmitting the data packet to the base IoT hub from the fourth node.

In another embodiment, a secure system for structuring IoT communications between IoT nodes and an IoT hub is provided. The system may include a base IoT hub. The base IoT hub may be in direct connection with the internet. The base IoT hub may include a transmitter module. The base IoT hub may include a validator module. The base IoT hub may include a processor module. The system may also include a first node, a second node, and a third node. The base IoT hub may be in electronic communication with the first node. The first node may be in electronic communication with the second node. The second node may be in electronic communication with the third node. The third node may be in electronic communication with the base IoT hub.

The first node may be configured to generate a data packet. The first node may also be configured to generate an authorization header that may be appended to the data packet. The first node may be further configured to generate a first encrypted ID authentication token. The first ID authentication token may be generated from node characteristics and configuration settings stored in a node profile of the first node.

The first ID authentication token may be inputted into a first segment of the authorization header. The first node may be further configured to transmit the data packet to a second node. The second node may be configured to generate a second encrypted ID authentication token and may input the second ID authentication token into a second segment of the authorization header. The second ID authentication token may be generated from node characteristics and configuration settings stored in a node profile of the second node. The second node may be further configured to transmit the data packet to a third node.

The third node may be configured to receive the data packet. The third node may be further configured to generate a third encrypted ID authentication token. The third token may be inputted into a third segment of the authorization header. The third ID authentication token may be generated from node characteristics and configuration settings stored in a node profile of the third node. The third node may also be configured to transmit the data packet to the base IoT hub.

The base IoT hub may be configured to receive the data packet from the third node. In the event that the data packet is received from a node other than the third node, the validator module may be configured to reject the data packet. The validator module may be configured to quarantine the data packet for validation. The quarantining may be necessary for validating the data packet prior to processing the data packet. The validator module may be configured to decrypt the authorization header. The validator module may be configured to perform a validation check on each of the three segments for verifying the validity of the data packet.

The validation check may be performed to verify the validity of each of the nodes that may have generated the ID authentication token.

The validation check may include confirming that each of the three segments contains an ID authentication token generated from the corresponding node. The validator module may be configured to verify that the decrypted node characteristics and configuration settings of the ID authentication token of each segment match to the node profile of its corresponding node.

The validator module may determine that one or more segments may be lacking an ID authentication token. In the event that one or more segments are lacking an ID authentication token, the transmitter module may be configured to return the data packet to the first node.

In certain embodiments, all three segments may include a generated ID authentication token. When all three segments include a generated ID authentication token corresponding to the corresponding node, the validator module may be configured to release the data packet. The processor module may be configured to process the data packet.

When the data packet is returned to the first node, the first node may be configured to generate a first ID authentication token. When the token is generated, the first node may be configured to input the token into the first segment of the authorization header. The first node may be further configured to forward the data packet to the second node. The second node may be configured to generate an encrypted ID authentication token. The token may be inputted into the second segment of the authorization header. The second node may be configured to forward the data packet to the third node. The third node may be configured to forward the data packet to the base IoT hub for processing.

When the data packet is forwarded to the second node, the system may be configured to check the second segment for a previously generated ID authentication token. In the event that the segment includes a generated ID authentication token, the system may be configured to forward the data packet to the third node without having to generate an ID authentication token.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of the methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method or another method described herein.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative system architecture 100. Architecture 100 may represent an internet of things ("IoT"). A differentiator between IoT and conventional networks is a traffic profile. In an IoT, nodes may not have defined or known network positions, communication protocols or security services. Solutions that allow architecture 100 to function seamlessly and leverage such disparate components are disclosed herein.

Architecture 100 may include nodes. Each node may include two or more nodes. FIG. 1 shows exemplary nodes 101, 103, 105, 107 and 109. Nodes 101, 103, 105, 107 and 109 may execute one or more of the functions of the first IoT node, the second IoT node, the third IoT node and/or the base IoT hub described herein. The architecture includes sensors 103. Sensors 103 may include devices that detect changes in a physical or virtual environment. For example sensors may measure audio, rainfall, temperature or water levels. Sensors may measure electronic network traffic, electronic signals (e.g., input or output) or frequency of user logins from within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smart phones, jewelry or refrigerators. Sensors may be relatively inexpensive and have low energy consumption. Sensors may "sense" two or more stimuli or environmental changes.

Sensors may implement two or more functions. For example, sensors may measure changes in their native environment, capture data related to the measured changes store and communicate the captured data. Sensors may be accessed by other sensors or any other node. Sensors may transmit captured data to another node. Sensors may broadcast captured data to two or more nodes.

Captured data may be transmitted using any suitable transmission method. For example, data captured by a sensor may be extracted by a mobile phone. Sensors may leverage a communication link provided by a mobile phone to communicate captured data to another node.

Each sensor may be a node and each sensor may be assigned a unique identifier. For example, sensors may be identified by one or more radio frequency identification ("RFID") tags. The RFID tag may be stimulated to transmit identity information about the sensor or any other information stored on the RFID tag.

Captured data may be transmitted by the sensor and processed far from the location of the sensor that captured the data. For example, captured data may be transmitted from one node to another node until the captured data reaches data repository 101.

Sensors may be positioned and capture data from diverse locations. Locations may include geographic locations or virtual locations on electronic networks. Captured data may be transmitted to a location where information is needed for decisioning or consumption, which may not be the same place the data was captured or generated. Data synchronization protocols and caching techniques may be deployed to ensure availability of information at, or delivery to, a desired node. For example, a location where data is captured may not have continuous reliable network connectivity. Accordingly, captured data may be stored locally on the sensor for an amount of time prior to transmission or broadcast to another node.

Contextually, captured data may provide information not only about the physical environment surrounding a sensor, but the capturing of data from multiple sensors may provide data that signifies an event. Sensors may be grouped. Sensors may be grouped based on physical proximity or based on the content (or expected content) of data captured. Sensors may be grouped virtually. Other nodes, such as data analysis engine 109 may create and/or be included in such groups. In some embodiments, the captured data may be organized by data repository 101.

Based on data captured from sensors 103, actuators 107 may respond to a detected event. Based on the capture and analysis of multiple sources of data, actuators 107 may be instructed to take action without human intervention.

Generally, sensors and other nodes that form part of architecture 100 may include a processor circuit. The processor circuit may control overall operation of a node and its associated components. A processor circuit may include hardware, such as one or more integrated circuits that form a chipset. The hardware may include digital or analog logic circuitry configured to perform any suitable operation.

A processor circuit may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a processor circuit may be coupled together by a system bus, wirelessly or by other interconnections and may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor for enabling a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 1, a node may operate in a networked environment. A node may be part of two or more networks. A node may support establishing network connections to one or more remote nodes. Such remote nodes may be sensors, actuators or other computing devices. Nodes may be personal computers or servers. Network connections may include a local area network ("LAN") and a wide area network ("WAN"), and may also include other networks. When used in a LAN networking environment, a node may be connected to the LAN through a network interface or adapter. The communication circuit may include the network interface or adapter.

When used in a WAN networking environment, a node may include a modem or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a battery, speaker, and antennas. Network nodes may be portable devices such as a laptop, tablet, smartphone, "smart" devices (e.g., watches, eyeglasses, clothing having embedded electronic circuitry) or any other suitable device for receiving, storing, transmitting and/or displaying relevant information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display power must be supplied to the entire backlight, even to illuminate just one pixel in the display. In contrast, an OLED display does not necessarily include a backlight. Furthermore, in an OLED display, preferably, only the illuminated pixel draws power.

The power efficiency of OLED technology presents a possibility for designing nodes that provide enhanced security and functionality. Illustrative devices that may be constructed using OLED technology are disclosed in U.S. Pat. No. 9,665,818, which is hereby incorporated by reference herein in its entirety.

A node may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, being executed by a computer. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing").

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that powers one or more components of a node.

Sensors in a single architecture or other grouping may be produced by different manufacturers. Sensors may capture data in different formats. For example, sensors may use different data structures to package captured data. Sensors 103 may utilize different communication protocols to transmit captured data or communicate with other nodes. Despite such operational differences, sensors 103 may operate substantially seamlessly together. Interoperability may allow captured data to be substantially seamlessly captured and interpreted by data analysis engine 109. Based on interpreting the captured data, data analysis engine 109 may issue instructions to actuators 107.

Interoperability may be implemented across any suitable nodes of architecture 100. Interoperability may enable communication between sensors 103 and other nodes. Interoperability may enable architecture 100 to provide services and applications via actuators 107. Interoperability may allow services and content to be provided anywhere, anytime and based on input/output of different nodes.

Data gathering by one or more of sensors 103 may be controlled by one or more other nodes of architecture 100. For example, data analysis engine 109 may control a quantity of data captured by sensors 103. Alternatively, data repository 101 and/or analysis engine 109 may filter or otherwise intelligently process data captured by sensors 103.

Timing of when data is captured by sensors 103 may be controlled by any suitable node on architecture 100. For example, data may be captured in real-time or at pre-defined intervals such as once a day. Data may also be captured in response to a detected environmental status change.

Data analysis engine 109 may filter data captured by sensors 103. Data analysis engine 103 may repackage or reformat captured data. Data conversion may include transformation of low level raw data (possibly from multiple sensors or groups of sensors) into meaningful information for a target audience or for a target analysis.

For example, captured data intended for human consumption or interaction may be converted into a human understandable format. Captured data intended for machine consumption may be converted into a format readable by a particular machine or node.

Data analysis engine 109 may perform pattern recognition to identify correlations and trends in captured data. Data analysis engine 109 may also evaluate a cost of obtaining data. "Costs" may be monetary (e.g., labor costs or infrastructure costs), time-related or related to a level of intrusion needed to obtain desired data. "Costs" may be bandwidth-related.

For example, a communication link may be associated with a fixed bandwidth. The bandwidth may limit an amount of information or a rate of transmission over the communication link.

For example, a sensor may respond slowly to a request from another node if there is a large amount of informational traffic traveling on a communication link shared with other nodes. The large amount of informational traffic may not leave sufficient bandwidth for the transmitting node to timely communicate with the requesting node.

As a further example, a sensor may respond slowly if the sensor transmits a large amount of captured data. The large amount of information transmitted by the sensor, together with other informational traffic traveling on the shared communication link, may be close to, or exceed the bandwidth of the communication link. As a result, sensors may be unable to transmit captured date in a timely manner.

Data travelling within architecture 100 to/from nodes may be routed along multiple communication links until the transmitted information reaches a desired destination node (e.g., data analysis engine 109). Each communication link may service a number of connected nodes and a respective volume of informational traffic.

It may be difficult to ascertain available bandwidth on a particular communication link. It may be difficult to ascertain which communication links are being utilized to transmit information between nodes. Nodes attempting to transmit information over a communication link may not be aware of a number of connected nodes, a volume of traffic on a particular communication link or a bandwidth capacity of a communication link.

Furthermore, a communication link may be controlled by a different entity from an entity responsible for operation of a particular node. The entity responsible for operation of the node may be unable to monitor a number of nodes that share a communication link, a bandwidth capacity of a communication link or a volume of traffic transmitted on a communication link. Despite difficult to predict conditions on a communication link, it would be desirable for a node to timely respond to a request for information or timely receive desired information.

Sensors 103 may belong to, or operated by, different administrative/management domains. Sensors 103 may be operated by different domains without expressly-defined relationships among such domains. The absence of express relationships enables access to data captured by sensors 103 by one or more architectures having one or more features in common with architecture 100. Groups of sensors may include sensors from two or more administrative domains.

Data repository 101 may receive data captured by sensors 103. In some embodiments, data captured by sensors 103 may be transmitted directly to data analysis engine 109. Data stored in repository 101 may be sorted and analyzed by data analysis engine 109. Data stored in data repository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics").

Based on captured data, data analysis engine 109 may optimize processes, reduce loss (e.g., fraud), improve customer understanding and targeting, increase automation, decrease latency in products and/or services provided by actuators 107 and identify new analytical models that may utilize data captured by sensors 103.

Architecture 100 may include one or more layers of software applications. Software applications may implement a variety of functions and provide varied services to nodes of architecture 100. Software applications running on data analysis engine 109 may submit requests to sensors 103 for retrieval of specific data to achieve a functional goal provided by actuators 107. Software applications may control data captured by sensors 103 or actions taken by actuators 107. Software applications may control a flow of information within architecture 100.

Software applications may be implemented on a node. A node may be an enterprise system or a "cloud" of computing devices. On device applications may be dependent on a specific hardware configuration. Such hardware requirements may preferably be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware such as sensors (e.g., to achieve a target functionality). Middleware may be responsible for aggregating data captured by sensors 103 and passing captured data to data repository 101 and/or data analysis engine 109.

Software applications may provide security services that mitigate threats to the integrity of data captured by sensors 103 or architecture 100 generally.

Actuators 107 may respond to data transmitted or processed by other nodes such as data analysis engine 109. Actuators 107 may include devices that modify the physical state of a physical entity. Actuators 107 may include devices that modify a virtual state of information. For example, actuators 107 may move (translate, rotate, etc.) physical objects or activate/deactivate functionalities of more complex ones. An actuator may dim a light bulb, open a door, change a temperature setting, authorize access to an automated-teller-machine ("ATM") and/or any other suitable functionality. Actuators 107 may verify identities, trigger electronic payments, extend credit or debit accounts.

Within an intelligent networked system such as architecture 100, sensors 103 perform the functions of input devices—they serve as, for example, "eyes," collecting information about their environment. In contrast, actuators 107 act as "hands," implementing decisions based on data captured by sensors 103. A single node may include the functions of sensors and actuators.

Actuators 107 may communicate with data analysis engine 109 and sensors 103. Actuators 107 may include an application programming interface ("API") for communicating with other nodes. Actuators 107 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision and communication processes for actuators 107.

In the absence of express relationships between sensors and the devices that access data captured by the sensors traditional approaches for managing trust, security naming, discovery, or other traditional network services may not be applicable or available.

Generally, nodes of architecture 100 may interact and cooperate using one or more interaction paradigms. Exemplary interaction paradigms include client-server and peer-to-peer interactions. Illustrative communication protocols may include HyperText Transfer Protocol ("HTTP"), Simple Object Access Protocol ("SOAP"), Representational State Transfer ("REST") Constrained Application Protocol ("CoAP") or SensorML.

As a result of the disparate nature of sensors 103, an architecture, such as architecture 100 incorporating sensors 103 may support a variety of communication protocols. Illustrative supported protocols may include IEEE 802.15.4 ("ZigBee"), IEEE 802.11, 3G and 4G and LTE. For example, ZigBee requires approximately 20 to 60 mW (for 1 mW transmission power, a range of 10 to 100 meters and a data transmission rate of 250 kbit/s).

To conserve energy, a sensor may communicate wirelessly for short periods of time. Utilizing this approach, one or more standard size single cell cylindrical dry battery batteries (e.g., AA size) may provide requisite computing power and wireless communication for many months.

Communication protocols used by nodes (e.g., sensors or actuators) may not have, or may not be capable of having, security capabilities. A security layer or buffer may be implemented by nodes that receive or rely on data captured by insecure sensors. Sensors or other nodes may be dynamically added or removed from an architecture. A security layer or buffer may be modular to scale quickly and meet growth/contraction requirements.

A physical layer may physically link nodes of architecture 100. The function of this physical layer is to provide communication pathways to carry and exchange data and network information between multiple sub-networks and nodes.

Figure 2:
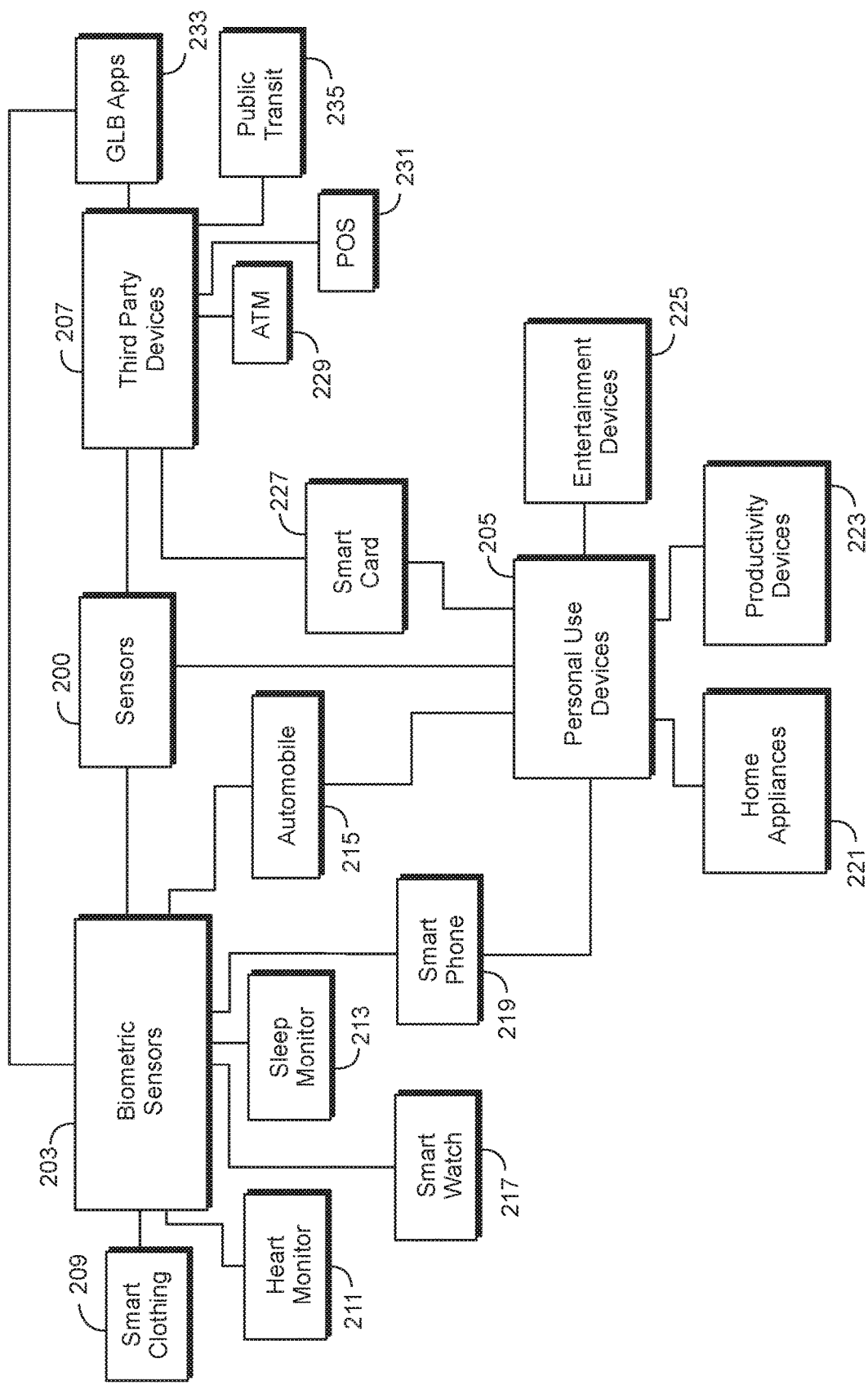
FIG. 2 shows illustrative sensors in accordance with principles of the invention.

FIG. 2 shows illustrative sensors 200. Sensors 200 may include or more features of sensors 103 (shown in FIG. 1). For the purposes of the application a sensor may be an IoT node. Sensors 200 include biometric sensors 203 that sense biometric attributes. For example, biometric sensors may be embedded in "smart" clothing 209 that monitors a wearer's physical condition. Such clothing may capture biometric data, such as pulse rate, temperature, muscle contraction, heart rhythm and physical movement. Smart clothing may be linked to smart phone 219 such as via a Bluetooth® communication link. Smart phone 219 may transmit data captured by smart clothing 209 to one or more other network nodes.

Biometric sensors 203 may include other illustrative sensors such as heart monitor 211, sleep monitor 213, smart watch 219, smart phone 219 and automobile 215.

Sensors 200 may include personal use devices 205. Personal use devices 205 may include sensors embedded in home appliances 221, productivity devices 223 or entertainment devices 225. Productivity devices 223 may include tablets, laptops or other personal computing devices. Entertainment devices may include gaming consoles and the like.

Sensors 200 also include third-party devices 207. Third-party devices may include devices that are not under the direct or exclusive control of a user. A user may interact with third-party devices 207 to obtain a desired service provided by the third-party.

Exemplary third party devices include smart card 227. Smart card 227 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Suitable purchasing instruments may include a credit card, debit card and electronic purchasing devices. Such purchasing instruments may sense a location or frequency of use.

Such purchasing instruments may include "EMV" chips. EMV is a technology that derives its name from the companies (Europay, MasterCard, and Visa) that helped develop the technology. When the credit card and its associated EMV chip are inserted into a specialized card reader (another sensor), the reader powers the EMV chip and the EMV chip generates a new authorization code each time the credit card is used. The EMV chip may capture transaction data such as amounts, location or identity of the chip reader.

Third-party sensors 207 may include ATMs 229, point-of-sale terminals ("POS") 231 and public transit 235. Such devices may also be actuators.

Third-party devices may also include software applications 233. Applications 233 may be used to access services, such as an online banking portal. Such applications may detect biometric features to authorize access to the online banking portal. Third-party devices may include sensors that capture data associated with power consumption (e.g., smart grids), electronic communication traffic, logistics (package movement) or any other suitable environmental condition.

FIG. 200 shows that sensors may categorically overlap. For example, an application used to access an online bank portal may capture a biometric feature (e.g., fingerprint) to authenticate a user.

Each of the sensors shown in FIG. 200 may include different and possibly incompatible hardware. For example, sensors may each have different operating systems (or none at all), processor types and memory. Sensors 200 may be inexpensive, single-function devices with rudimentary network connectivity. Sensors 200 may be positioned in remote and/or inaccessible locations where human intervention or configuration is difficult.

To conserve power, sensors 200 may utilize 16-bit microcontrollers. Such microcontrollers may use less than 400 μW per MIPS ("million instructions per second") and may be capable of operating TCP/IPv6 stacks with 4 kB RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication standards.

Furthermore, because of potentially disparate features and characteristics of sensors 200, security solutions disclosed herein may be used to verify an authenticity of data transmitted by sensors having disparate hardware and software capabilities.

Figure 3:
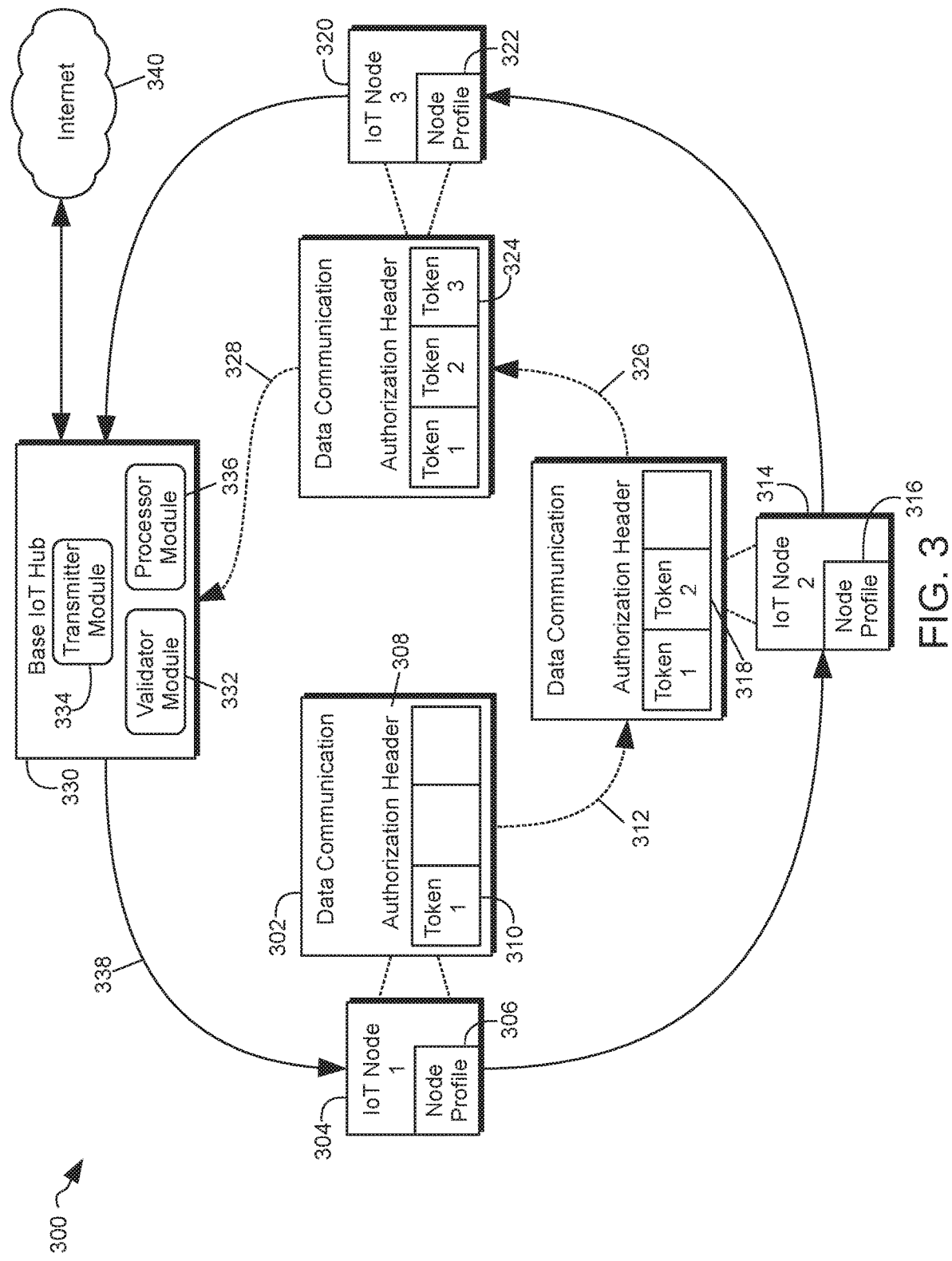
FIG. 3 shows an illustrative system in accordance with principles of the invention.

FIG. 3 shows illustrative IoT communication system 300. The system may include base IoT hub 330. Hub 330 may be in direct communication with the internet 340. Hub 330 may include a validator module 332 for verifying and validating data communications being received at the hub 330. Hub 330 may also include processor module 336. Processor module 336 may be configured to process and execute data that may be verified by validator module 332. Hub 330 may also include transmitter module 334. In certain embodiments, transmitter module 334 may be configured to transmit data communication 302 from the IoT hub 330 to the first IoT node 304 as shown at 338.

Data communication 302 may be generated at the first IoT node 304. IoT node 304 may be configured to transmit data communication 302 to the second IoT node 314. IoT node 314 may be configured to transmit data communication 302 from the IoT node 314 to the third IoT node 320. IoT node 320 may be configured to transmit data communication 302 from IoT node 320 to hub 330.

Data communication 302 may be generated initially at IoT node 304. Node 304 may include a node profile 306. Node profile 306 may include node characteristics and configuration settings of node 304. IoT node 304 may generate an authorization header 308 appended to the data communication in order to secure the communication.

Authorization header 308 may include three segments. Each segment may require a generated ID authentication token being inputted into the segment. Node 304 may generate a first encrypted ID token and input it into segment 310. The token may be generated from stored settings in the node profile 306. Once the first token is generated, the first node may be configured to transmit data packet 302 to the second node 314 as shown at 312. Node 314 may generate a second encrypted ID token and input it into segment 318. The token may be generated from stored settings in the node profile 316 of the second IoT node 314. Once the second token is generated, the second token may be configured to transmit data packet 302 to the third node 320 as shown at 326. Node 320 may generate a third encrypted ID token and input it into segment 324 of authorization header 308. The token may be generated from stored settings in the node profile 322 of the third IoT node 320. Once the third token is generated, IoT node 320 may be configured to transmit data packet 302 to the base IoT hub 330 to be processed. Validator module 332 may be configured, prior to processing the data packet 302, to validate the first ID token 310, the second ID token 318 and the third ID token 324 included in authorization header 308.

Figure 4:
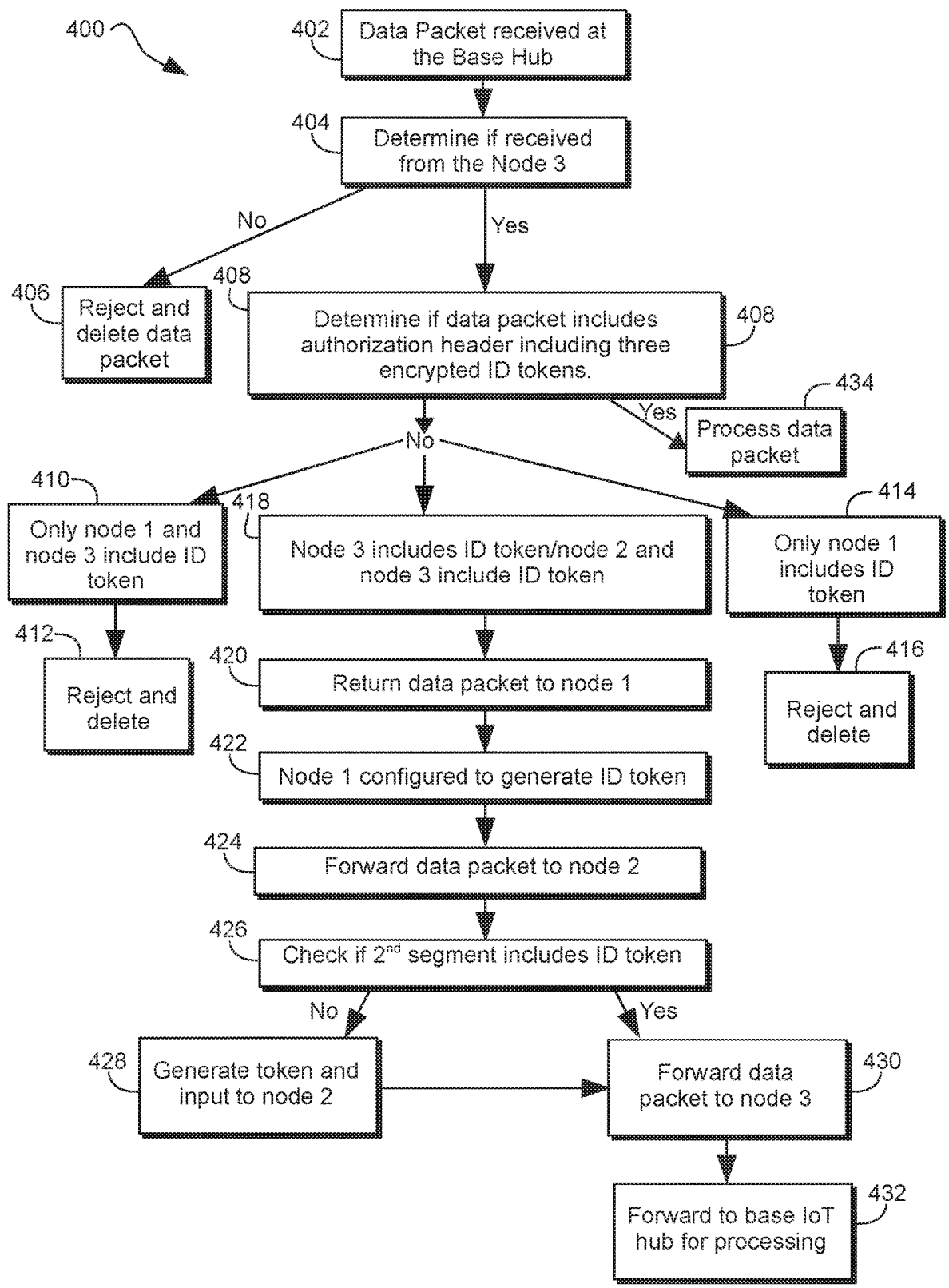
FIG. 4 shows an illustrative flow chart in accordance with principles of the invention.

FIG. 4 shows flow chart diagram 400 that may represent a process for communicating data within a structured IoT communication system. At initiation of the process 402, a data packet is received at the base hub. The data packet may have been generated from either a first node, a second node, or a third node. At step 404 the hub may determine which node transmitted the data to the hub. If the data packet was transmitted from any node other than the third node, the next step in the process may be step 406. At this step, the system may reject and delete the data packet. If it is determined at the hub that the data packet was received from the third node, the next step in the process may be step 408. The hub may be configured to perform a validation check to confirm that all three segments include an encrypted ID authorization token that corresponds to its corresponding node. If it is determined that all three segment include a corresponding encrypted ID token, the next step may be the hub may be configured to process and execute the data packet as shown at step 434. If one or more of the segments are lacking a token, the next step in the process may be one of steps 410, 414 and 418.

When it is determined that the first and third nodes only contain an authenticated ID token and the second one is lacking an authenticated ID token, as shown at step 410, this may indicate a mismatch in this structured communication system. The next step 412 in the process may be to reject the communication and delete it from the system via the hub.

Because of the structure of the system, wherein each node requires generating an ID token prior to transmitting the data to the next node, when certain nodes are lacking a token, the communications may automatically be rejected to ensure security in the system. In certain embodiments, it may be determined, as shown at step 414, that only the first node may include an authenticated ID token. The next step in the process may then be step 416 where the hub is configured to reject and delete the data packet.

When the communication is within the structure of the system, it may be determined that the first segment may be lacking an authenticated ID token. It may be determined that the first and second segment may be lacking an authenticated ID token as shown at step 418. In this embodiment, this may occur when data has been generated at the second node or when data has been generated by the third node. Therefore the data has not yet been transmitted to the first node for a generated ID token. The system is setup as a circuit wherein when the data is generated at the second node, the data gets passed to the third node and then to the hub. Therefore it may be necessary for the data packet to be transmitted to the first node at step 420. The first node may be configured to generate an ID token at step 422. The first node may then be configured to forward the data packet, at step 424 to the second node. The next step 426 may determine if the second node requires generating an ID token. If the data packet was generated originally at the third node, the second node may then be configured to generate an authenticated ID token at step 428 and then may forward the data packet to the third node at step 430. If the data packet was generated originally at the second node, then the second node already includes a token and the next step may be step 430 where the data may be forwarded to the third node. The next step 432, may then be to forward the data packet to the base hub for processing the data.

Thus, systems and methods for structuring IoT communications between IoT nodes and an IoT hub to enhance network security and provide structure in overall network communications is provided. Persons skilled in the art will appreciate that the present invention can be practiced by other than the described embodiments, which are presented for purposes of illustration rather than of limitation. The present invention is limited only by the claims that follow.

What is claimed is:

1. A method for structuring IoT communications between a first node, a second node, a third node and a base IoT hub having a direct connection to the internet, the method comprising the base IoT hub:
   receiving a data packet from the third node, the data packet including an encrypted authorization header, the authorization header including:
      a first segment corresponding to the first node;
      a second segment corresponding to the second node; and
      a third segment corresponding to the third node;
   quarantining the data packet for validation;
   decrypting the authorization header;
   performing a validation check on each of the three segments for verifying the validity of the data packet, the validation check comprising confirming that each of the three segments contains an ID authentication token generated by the corresponding node;
   when one or more of the three segments is determined to lack an ID authentication token, returning the data packet to the first node; and
   when all three segments contain an ID authentication token:
      releasing the data packet from the quarantine; and
      processing the data packet.

2. The method of claim 1 further comprising the base IoT hub rejecting the data packet prior to the quarantining when the data packet is received from a node that is not the third node.

3. The method of claim 1 wherein when the data packet is returned to the first node the method further comprises:
   the first node generating an ID authentication token, inputting the token into the first segment of the authorization header and forwarding the data packet to the second node;
   the second node generating an ID authentication token, inputting the token into the second segment of the authorization header and forwarding the data packet to the third node; and the third node forwarding the data packet to the base IoT hub for processing.

4. The method of claim 3 wherein, when the data packet is forwarded to the second node, the method further comprises, prior to generating a token, the second node:
checking the second segment for a previously generated ID authentication token; and
in the event that the second segment includes a generated ID authentication token, forwarding the data packet to the third node.

5. The method of claim 1 wherein when the base IoT hub determines that the authorization header includes an ID authentication token inputted only from the first and third node, the method further comprises the base IoT hub rejecting the data packet.

6. The method of claim 1 wherein when the base IoT hub determines that the authorization header contains only an ID authentication token from the first node, the method further comprises the base IoT hub rejecting the data packet.

7. The method of claim 1 wherein each generated ID authentication token comprises encrypted node characteristics and encrypted configuration settings of the node that generated the token.

8. The method of claim 7 wherein the validation check performed by the base IoT hub further comprises verifying that the decrypted node characteristics and configuration settings of each ID authentication token match to a node profile of the corresponding node that generated the token, the profile comprising characteristics and configuration settings of the node.

9. The method of claim 8 wherein, in the event that one or more ID authentication tokens are not verified by the base IoT hub, the method further comprises the base IoT hub rejecting the data packet and running an algorithm for evaluating the integrity of the node.

10. The method of claim 1 wherein when the data packet received at the base IoT hub lacks a data authorization header, the method further comprises the base IoT hub deleting the data packet.

11. The method of claim 1, when the authorization header is a first authorization header, the method further comprising the base IoT hub linking a fourth node to the base IoT hub, the linking comprising:
running an authentication routine on the fourth node, the authentication routine including assessing configuration settings and IoT node characteristics of the fourth node to assess compliance with a runbook stored in a base IoT hub database;
generating a second authorization header including a fourth segment corresponding to the fourth node;
instructing the first, second and third node to replace the first authorization header with the second authorization header;
instructing the third node to transmit all data packets to the fourth node and not to the IoT hub.

12. The method of claim 11 wherein the fourth node further comprises:
generating an encrypted ID authentication token;
inputting the generated ID authentication token into the fourth segment of the header; and
transmitting the data packet to the base IoT hub from the fourth node.

13. A secure system for structuring IoT communications between a first node, a second node, a third node and a base IoT hub, the system comprising:

the base IoT hub in direct connection with the internet, the base IoT hub including a transmitter module, a validator module and a processor module;
the first node configured to:
generate a data packet;
generate an authorization header appended to the data packet;
generate a first encrypted ID authentication token;
input the first ID authentication token into a first segment of the authorization header; and
transmit the data packet to the second node;
the second node configured to:
generate a second encrypted ID authentication token;
input the second ID authentication token into a second segment of the authorization header; and
transmit the data packet to the third node; and
the third node configured to:
generate a third encrypted ID authentication token;
input the third ID authentication token into a third segment of the authorization header; and
transmit the data packet to the base IoT hub.

14. The system of claim 13 wherein the system is a circuit comprising the base IoT hub in electronic communication with the first node, the first node in electronic communication with the second node, the second node in electronic communication with the third node and the third node in electronic communication with the base IoT hub.

15. The system of claim 14 wherein when the base IoT hub receives a data packet from the third node, the validator module is configured to:
quarantine the data packet for validation;
decrypt the authorization header;
perform a validation check on each of the three segments for verifying the validity of the data packet, the validation check comprising confirming that each of the three segments contains an ID authentication token generated from the corresponding node;
when one or more of the three segments is lacking an ID authentication token, the base IoT hub is configured to return the data packet to the first node; and
when all three segments contain an ID authentication token, the processor module is configured to:
release the data packet; and
process the data packet.

16. The system of claim 15 wherein when the validation check determines that one or more segments lack an ID authentication token, the transmitter module is configured to return the data packet to the first node and the first node is configured to:
generate an encrypted ID authentication token;
input the token into the first segment of the authorization header; and
forward the data packet to the second node.

17. The system of claim 16 wherein the second node is further configured to:
receive the data packet from the first node;
check the second segment for a previously generated ID authentication token;
if the second segment includes a generated ID authentication token, the second node is configured to forward the data packet to the third node; and
if the second segment is lacking an ID authentication token, the second node is configured to:
generate an encrypted ID authentication token;
input the token into the segment of the authorization header; and
forward the data packet to the third node.

18. The system of claim 17 wherein the third node is further configured to:
 receive the data packet from the second node; and
 forward the data packet to the base IoT hub.

19. The system of claim 13 wherein when the data packet is received from a node that is not the third node, the validator module is further configured to reject the data packet prior to the quarantine.

20. The system of claim 13 wherein:
 the first generated ID authentication token includes encrypted node characteristics and encrypted configuration settings of the first node;
 the second generated ID authentication token includes encrypted node characteristics and encrypted configuration settings of the second node; and
 the third generated ID authentication token includes encrypted node characteristics and encrypted configuration settings of the third node.

\* \* \* \* \*